United States Patent Office 3,260,71[1]
Patented July 12, 196[6]

3,260,711
PRODUCTION OF VINYL CHLORIDE POLYMERS
Gilbert P. Christen, Lyon, and Michel Ruaud, Bron, France, assignors to Rhone-Poulenc S.A., Paris, France, a corporation of France
No Drawing. Filed Jan. 18, 1963, Ser. No. 252,323
Claims priority, application France, Jan. 30, 1962, 886,369
10 Claims. (Cl. 260—92.8)

This invention relates to the production of vinyl chloride polymers which have high softening points and excellent mechanical properties.

It is known to polymerise vinyl chloride at low temperatures, for example at a temperature between $-25°$ and $+10°$ C., in the presence of trichloroacetyl peroxide as catalyst. However, the only method hitherto employed has been a bulk reaction, and this has the disadvantage that a thick mass which is difficult to stir rapidly forms when the conversion of the monomer reaches 10% to 20%. As the conversion continues to increase, which requires a very long reaction period, the mass of polymer becomes very hard. In addition, the heat liberated in the course of the polymerisation is difficult to eliminate. Such a method is therefore not very suitable for industrial operations.

The present invention makes it possible to obviate the aforesaid disadvantages and to obtain, by a method of low-temperature polymerisation in aqueous suspension, polyvinyl chlorides of uniform molecular weight which have excellent physical and mechanical characteristics.

According to the invention, polyvinyl chloride is made by polymerising vinyl chloride at a temperature of $-25°$ to $-5°$ C. in the presence of a free radical-generating catalyst and of a protective colloid, employing as the polymerisation medium an aqueous solution of one or more mineral salts inert towards vinyl chloride of concentration such that all the salt remains in solution at the polymerisation temperature. The preferred salts are the chlorides and sulphates of the alkali metals and the chlorides of the alkaline-earth metals, for example sodium chloride, sodium sulphate, and the chlorides of calcium and magnesium.

The concentration of the salt solutions must be such that no salt is deposited on cooling to the aforesaid low reaction temperatures. If, for example, a sodium chloride brine is employed, a concentration of 15–23% by weight is quite suitable. Generally speaking, the concentration should not be lower than 8% by weight.

The polymerisation is preferably carried out at a temperature of $-20°$ to $-10°$ C. The preferred catalyst is trichloroacetyl peroxide, and the preferred protective colloid is polyvinyl alcohol.

If desired, the catalyst may be prepared in situ. For example, trichloroacetyl peroxide can be made by introducing sodium peroxide and trichloroacetyl chloride into the reaction mass at a temperature below $-5°$ C. and preferably about $-20°$ to $-10°$. It is possible by this procedure to avoid having to store the trichloroacetyl peroxide at the very low temperature necessary (of the order of $-78°$ C.), and also the danger of explosion during the handling of this peroxide.

The polymerisation catalyst and the protective colloid can be employed in the proportions normally required for the polymerisation of vinyl chloride, i.e. about 0.05% to 3% of the former and 0.01% to 1% of the latter, calculated on the weight of the vinyl chloride.

In addition, the degree of polymerisation may be adjusted by adding a chain-modifying agent for vinyl chloride polymerisation, such as a halogenated hydrocarbon, e.g. chloroform, carbon tetrachloride or bromoform; an aldehyde, e.g. acetaldehyde or butyraldehyde; a mercaptan, e.g. lauryl mercaptan; or an alcohol, e.g. methanol or ethanol. Such agents are well known.

The polymers obtained by the process of the invention possess excellent physical and mechanical properties which are superior to those of polymers prepared by the conventional method of suspension polymerisation at a temperature of 40–70° C. Their Vicat temperature (measured in accordance with the ASTM Standard D–1525-58T by penetration of a point having a cross-sectional area of 1 mm.$^2$ and loaded to 1 kg. on a compression-moulded disc 4 mm. thick, with a temperature rise of 120° C./hour) is extremely high, of the order of 120° to 140° C. and even more; the Vicat temperature of conventional polyvinyl chlorides does not exceed 90° C. On the other hand, the Afnor viscosity index (determined in accordance with the Standard N.F. T.51,013) may vary within wide limits, for example from 100 to 600 ml./g., in accordance with the proportion of chain-modifying agent employed (if any). These polyvinyl chlorides are particularly suitable for the manufacture of fibres and films having good mechanical properties and high thermal stability.

The following examples illustrate the invention without limiting it in any way:

*Example 1*

Into an enamelled 25 litre autoclave flushed with nitrogen are introduced 5.2 kg. of liquid vinyl chloride, and then 15.5 kg. of a 23% aqueous sodium chloride solution containing in addition 26 g. of polyvinyl alcohol ("Rhodoviol HS–100"), and the mixture is cooled with stirring to about $-20°$ C. There are then introduced 11 g. of trichloroacetyl peroxide (i.e. about 0.2% calculated on the vinyl chloride), the temperature is allowed to rise to $-10°$ C. and the reaction mass is maintained at this temperature for 15 hours with stirring.

After this time, the polymer suspension obtained is withdrawn from the autoclave and is thereafter centrifuged, washed with distilled water and then dried in vacuo at 45° C. There are thus obtained 3.8 kg. of white fine-grained polyvinyl chloride having the following characteristics:

Specific viscosity (determined on a 0.5% solution in cyclohexanone) _____ 2.850.
Afnor viscosity index _____ 570 ml./g.
Vicat temperature _____ 128° C.
Tensile strength in kg./cm.$^2$ __ 420 at 25° C., 400 at 50° C., 300 at 70° C.

*Example 2*

The procedure of the preceding example is followed, with the same proportions of ingredients except that, instead of trichloroacetyl peroxide, the quantities of sodium peroxide and trichloroacetyl chloride corresponding to 40 g. of trichloroacetyl peroxide are introduced at a temperature of $-20°$ C.

There are obtained 4.6 kg. of polymer having an Afnor viscosity index of 380 ml./g. and a Vicat temperature of 126° C. The tensile strength is 600 kg./cm.$^2$ at 25° C., 400 kg./cm.$^2$ at 60° C. and 180 kg./cm.$^2$ at 90° C.

*Example 3*

Polymerisation is effected, under the same conditions as in Example 1, but after the addition to the brine of 3.5% of chloroform and employing 0.5% of catalyst (both by weight on the vinyl chloride).

There are obtained 3.6 kg. of polyvinyl chloride having an Afnor viscosity index of 296 ml./g. and a Vicat temperature of 123° C.

When 26% of chloroform is employed the polymer obtained has an Afnor viscosity index of about 130 ml./g. and a Vicat temperature of 121° C. The tensile strength of the product is 600 kg./cm.² at 25° C., 400 kg./cm.² at 70° C. and 180 kg./cm.² at 90° C.

We claim:
1. In the production of polyvinyl chloride by the polymerisation of vinyl chloride in the presence of a free radical-generating catalyst in an aqueous medium containing a protective colloid, the improvement which consists of carrying out the polymerisation at a temperature between −25° C. and −5° C. using as the aqueous medium a solution of at least one mineral salt inert towards vinyl chloride, the concentration of the salt in the medium being at least sufficiently high to cause the medium to remain liquid at the polymerisation temperature but below the minimum at which salt will separate from the medium at the said temperature.

2. Process according to claim 1, wherein the polymerisation is effected at a temperature of −20° to −10° C.

3. Process according to claim 1, wherein the protective colloid is a polyvinyl alcohol.

4. Process according to claim 1, wherein the catalyst is trichloroacetyl peroxide.

5. Process to claim 4, wherein the catalyst is formed in situ from sodium peroxide and trichloroacetyl chloride at a temperature below −5° C.

6. A process for the production in suspension of polyvinyl chloride, which comprises polymerising vinyl chloride at a temperature of −20° to −10° C. in the presence as catalyst of trichloroacetyl peroxide and as protective colloid of polyvinyl alcohol, employing as the polymerisation medium an aqueous solution of at least one mineral salt inert towards vinyl chloride, the concentration of the said salt in the medium being at least sufficiently high to cause the medium to remain liquid at the polymerisation temperature, but below the minimum concentration at which the salt will separate from the polymersiation medium at the said temperature.

7. Process according to claim 1, wherein the polymerisation medium is an aqueous solution of at least one salt selected from the group which consists of the alkali metal chlorides and sulphates and the alkaline earth metal chlorides.

8. Process according to claim 6, wherein the polymerisation medium is an aqueous solution of at least one salt selected from the group which consists of the alkali metal chlorides and sulphates and the alkaline earth metal chlorides.

9. Process according to claim 6, wherein the polymersation medium is an aqueous solution of sodium chloride of concentration 15 to 23% by weight.

10. Process according to claim 1 wherein the concentration of the salt in the polymerisation medium is at least 8% by weight.

References Cited by the Examiner

UNITED STATES PATENTS

| | | | |
|---|---|---|---|
| 2,570,056 | 10/1951 | Halbig | 260—92.8 |
| 2,572,028 | 10/1951 | Hunt | 260—92.8 |
| 2,575,135 | 11/1951 | Schulze et al. | 260—92.8 |
| 2,584,306 | 2/1952 | Theobald | 260—92.8 |
| 2,586,550 | 2/1952 | Miller | 260—92.8 |
| 2,673,193 | 3/1954 | Kolvoort | 260—92.8 |
| 2,981,724 | 4/1961 | Holdsworth | 260—92.8 |
| 3,057,831 | 10/1962 | Holdsworth | 260—92.8 |
| 3,062,759 | 11/1962 | Bingham et al. | 260—92.8 |

FOREIGN PATENTS 834,937    5/1960    Great Britain.

OTHER REFERENCES

Schildknecht: Vinyl and Related Polymers, pages 15, 26, 106, 220, 330, 504 (1952), Wiley.

JOSEPH L. SCHOFER, *Primary Examiner.*

J. F. McNALLY, *Assistant Examiner.*